Nov. 1, 1938.   H. KRAEKEMIER   2,134,720
SPRING ASSEMBLY
Filed May 23, 1935   2 Sheets-Sheet 2
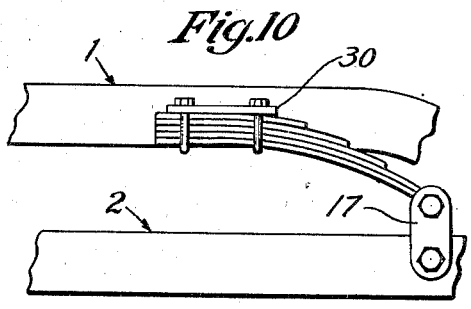
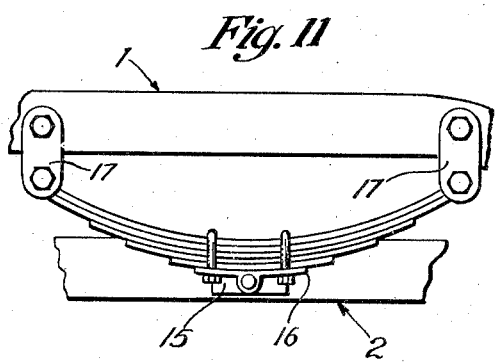
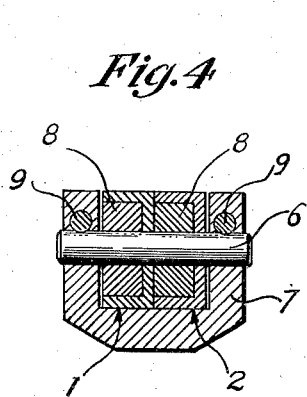
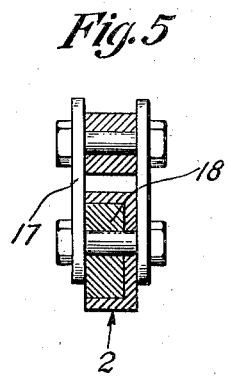
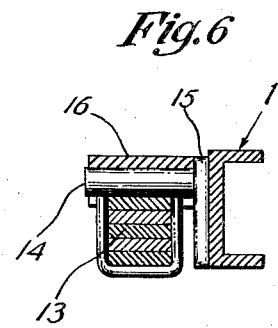
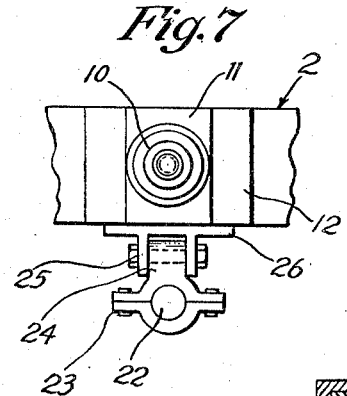
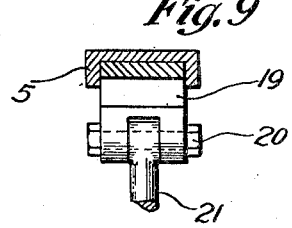
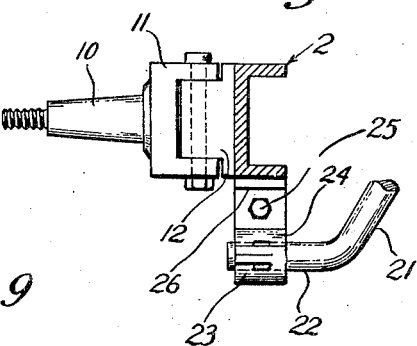
INVENTOR.
Herman Kraekemier
BY
ATTORNEY Patented Nov. 1, 1938

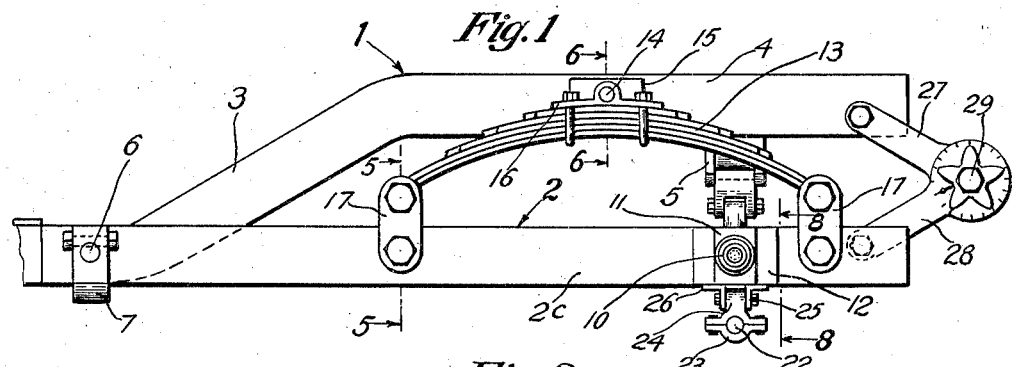
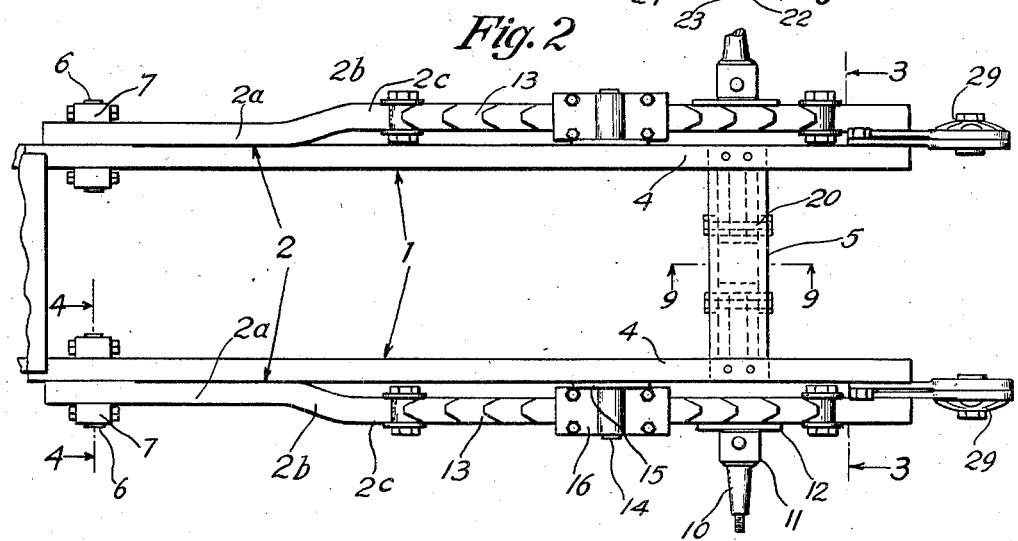
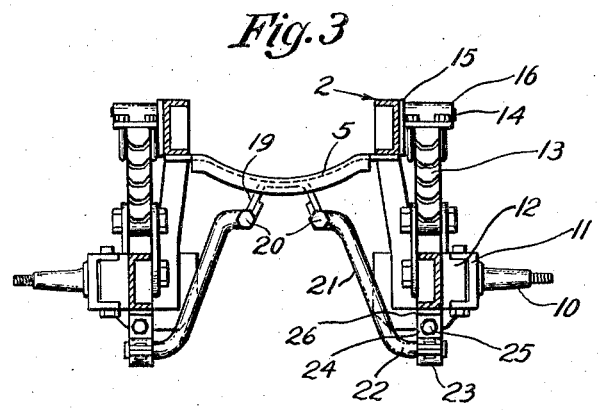

2,134,720

UNITED STATES PATENT OFFICE 2,134,720

SPRING ASSEMBLY

Herman Kraekemier, Bridgeport, Conn.

Application May 23, 1935, Serial No. 23,016

22 Claims. (Cl. 267—19)

My invention relates to spring assemblies..

It has among its objects to provide an improved independently sprung wheel spring assembly especially adapted to improve the riding qualities of an automobile or the like. A further object of my invention is to provide such an improved spring assembly whereby it is made possible, while utilizing a markedly simple and inexpensive lever connected spring mechanism to obtain improved springing effects previously obtainable only with a far longer spring and wheel base. Another object of my invention is to produce an improved construction wherein, as a result of an improved main and supplementary axle carrying frame structure, and improved associated spring means, it is made possible to obtain the above advantages while also requiring relatively inexpensive springs and producing an inexpensive spring assemly. Other objects of my invention are to produce such an improved and simplified structure especially adapted to use in connection with the front end of an automobile, and to produce such a spring assembly which is well adapted to produce a vertically compact structure of exceedingly rugged character. These and other advantages of my improved construction will, however, hereinafter more fully appear.

In the accompanying drawings, I have shown for purposes of illustration, certain embodiments which my invention may assume in practice.

In the drawings:—

Figure 1 is a side elevation of one form of my improved spring assembly;

Fig. 2 is a plan view of the same;

Fig. 3 is a sectional view on line 3—3 of Figure 2;

Fig. 4 is a sectional view on line 4—4 of Figure 2;

Fig. 5 is a sectional view on line 5—5 of Figure 1;

Fig. 6 is a sectional view on line 6—6 of Figure 1;

Fig. 7 is an enlarged side elevation of the axle construction shown in Figure 1;

Fig. 8 is a sectional view on line 8—8 of Figure 1;

Fig. 9 is a sectional view on line 9—9 of Figure 2;

Fig. 10 is a detail side elevation showing a modified form of spring, and

Fig. 11 is a like view showing a further modified construction.

In this illustrative construction, it will be noted that I have shown the front end of a main automobile frame, generally indicated at 1, and which herein is provided with an improved axle carrying sub-frame, generally indicated at 2, and with an improved independently sprung wheel spring means operatively connecting the frames 1 and 2 in an improved manner, all as hereinafter more fully described.

Referring more particularly to this construction, note that the main frame 1 comprises spaced vertically disposed side members which may be of any suitable cross-section and herein are of U-section and also provided with upwardly inclined portions 3 spaced from their front ends, and with horizontal portions 4 forming the front extremity of the frame. Further, it will be noted that these side members are also rigidly connected near their front ends into a rigid frame by a suitable motor supporting member 5, which herein is also depressed between its ends in such manner as to accommodate the motor and permit desirable lowering thereof. Further, it will be observed that the sub-frame 2 also comprises like side members which are independently pivoted on the frame 1 at the bases of the inclined portions 3 thereof, as indicated at 6. Moreover, improved spring means are connected between side members of the main frame 1 and the side members of the sub-frame 2, so that the front axles, which are carried on different members of the sub-frame, may have an improved movement relative to the main frame.

Referring more particularly to the pivotal connection for the sub-frame, note that herein each side member of the sub-frame has a portion 2a adjacent its pivot and disposed in planes parallel to the vertical plane of the portions 3 on the side members of the main frame, and adapted to move up and down in adjacency to the outer faces of its adjacent portion 3, about the pivot 6. Moreover, note that herein independent pivot pins 6 are provided, one for each side of the frame, and that each is mounted in a U-shaped bracket 7, open at the top, and receiving between the same the adjacent portion of the main and sub-frame side members. Here it will also be noted that as shown in Figure 4, each of the adjacent side members is also suitably filled, as by blocks 8 attached in any suitable manner thereto, in such manner as to increase the bearing surface and strength of the parts, while the pin 6 is also fixed in place by relatively perpendicularly disposed pins 9, engaging with the ends of the pin 6 and disposed transversely of the arms in the U-bracket 7, as shown in Figures 1, 2 and 4. Thus, it will be evident that either sub-frame side member is free to move upwardly or downwardly about its pivot pin 6 to accommodate itself to varying conditions.

It will also be observed that in front of each portion 2a, each side member is provided with a slightly laterally deflected portion 2b, and in front of this portion 2b, with an elongated portion 2c spaced from the plane of the main frame side members and below the latter. Attention is further directed to the fact that near the front end of each of these portions 2c, improved axle mounting means is provided. Herein, each of these means is carried on the outer flat face of its portion 2c, and each includes an axle 10, carried on a usual swivel 11 mounted on brackets 12 suitably fixed to a portion 2c by any suitable means, as, for example, by welding or riveting. As a result of this construction, it will be noted that the sub-frame 2 is free to move about its pivot pins 6 in accordance with variations of the roadway beneath the wheels carried on the axles 10 which, it will be understood, are connected to one another and to common steering mechanism through usual connecting and steering mechanism, not shown.

Operatively connected between the portions 4 of the main frame and the portions 2c of the sub-frame, is improved spring mechanism. Here this mechanism is illustrated in Figure 1 as including an independent semi-elliptical spring 13 of the leaf type at each side of the main frame. Further, as illustrated, each spring is pivotally mounted at 14 substantially midway between the ends of the horizontal end portions 4 of the main frame members and herein slightly more remote from the extremity of these portions than from the inclined portions 3. As shown herein, the pivots 14 are also in the form of pivot pins projecting laterally from the outer faces of the portions 4 and carried by suitable blocks 15 on the latter and extending into bearing brackets 16 carried on the tops of the spring 13. Moreover, it will be noted that the lower ends of the convex spring 13 are pivotally connected through suitable spring shackle connections 17 to the sub-frame 2; the U-shaped section of the sub-frame at each point also preferably being suitably filled out by a suitably attached filler 18 to provide a journal, as shown in Figure 5. Thus, it will be evident that each side member of the sub-frame is independently sprung by a single spring 13 and is so connected to the main frame that it may rise and fall independently of the latter or of the other side member of the sub-frame.

Attention is further directed to my improved operative connection provided between the motor supporting member 5 and each side member of the sub-frame. Here it will be noted that under the transverse motor support 5, a depending U-shaped member 19 is provided having spaced arms. Further, pivotally connected on longitudinal pivots 20 at the lower ends of these arms are downwardly and outwardly disposed connecting members 21, which are provided at their lower ends with transverse extensions 22 leading underneath the frame portions 2c, said members 21 being disposed in planes located substantially at right angles to the arms 2. As shown, each of these portions 22 is rigidly connected to a bracket 23 which is provided with an upper extension 24 thereon, in turn swivelled on a longitudinally extending swivel connection 25 on a bracket 26 attached to the under side of one of the portions 2c near the front thereof. Herein this connection is directly beneath the axle carrying brackets 12 but it will be evident that the arrangement may be varied. As a result of this construction including the pivoted connections 21, it will be evident that each side member of the sub-frame will be connected to the main frame not only through the pivot pins 6, but also through a member 21 and the pivotal connections 20 and 25 therefor, in a most effective manner insuring vertical movement about the pivots 6.

Upon any relative movement of the parts, the same will be cushioned and returned to normal position by the spring 13. It will further be noted that my improved construction lends itself readily to the use of other shock absorbing means than the spring 13, if desired. Obviously, various types of shock absorbers may be used, but it will be noted that I have herein illustrated, for simplicity of illustration, a shock absorber of the well known Hartford type, including arms 27 and 28 pivoted respectively on the upper portion 4 and lower portion 2 adjacent the extremities thereof and operatively connected as at 29 through the shock absorbing mechanism common to this type of shock absorber. It will be understood, however, that I do not wish in any way to be restricted to the use of this particular type of shock absorber, the same being used merely for illustrative purposes and other types of hydraulic shock absorbers also being contemplated.

Attention is further directed to Figure 10 wherein a modified form of spring construction is illustrated which may be used, if desired. Here it will be noted that the spring is the equivalent of one-half of the spring shown in Figure 1, and that the spring is provided with only one shackle connection to the sub-frame. Further, it will be noted that the spring, as distinguished from being pivoted at its upper end, as previously described, is herein fixed at its upper end to a bracket 30, which is in turn fixed to the outer face of the portion 4. Further, it will be evident that such a fixed bracket may be used with a spring such as shown in Figure 1 although such a fixed bracket construction is not preferred. It will of course also be apparent that if desired, even shorter spring means may be used, even, for example, a coiled spring; my improved structure with the increased leverage of the sub-frame making improved results obtainable therewith. As showing a further modification, attention is also directed to Figure 11, wherein it will be noted that a spring, generally corresponding to that shown in Figure 1 and having similar pivotal and shackle connections is provided, but oppositely disposed with respect to the spring shown in Figure 1, this construction also being usable, if desired.

As a result of my improved construction, it will be noted that it is made possible to obtain, through the use of my improved lever and spring mounted sub-frame, the benefits of a longer spring base, and of individual spring mounting of the wheels. Further, it will be noted that the structure is such as to require a simple and inexpensive form of spring, and that the spring mounted frame structure is such as to be not only exceedingly rugged, but adapted to meet the varying conditions incident to use. It will also be observed that it minimizes wear on the tires, since, with the axles carried on the sub-frame, the wheels and tires move vertically on the sub-frame without lateral scrubbing. With the construction described, the wheel carrying portions of the side members or arms move about the pivots 6 in vertical planes directed longitudinally of the vehicle. There is no scrubbing on the tires such as is produced where the wheel-carrying portion of a wheel-carrying member or arm is arcuately moved in a transverse plane as the wheel moves up and down. The flexible connections between the vehicle frame and the wheel carrying arms, comprising the parts 21, 23, 25, permit the wheel-carrying portions of the arms to move in vertical planes directed longitudinally of the vehicle, owing to the fact that the links 21, as the arms are raised and lowered, are free to move about the longitudinally directed pivots or swivel members 25. At the same time, however, that the flexible connections permit such vertical movement, they hold the arms in position laterally at the wheel carrying portions thereof. This is due to the rigid connection of the transverse member 21 with the upstanding member 24 and the pivotal connection 26 to the arms 2 and the member 12 carrying the stub axle 10. Moreover, note that the arms 2 and the transverse member 21 are disposed at right angles to each other in such a manner that an exceedingly strong construction is produced wherein the stub axle 10 is so located adjacent the intersection of these members as to be adequately braced while having the desired up and down movement. Should it be desired for any reason it will be evident that the ends of the portions 22 may be extended to form the axles. Attention further is directed to the fact that the structure, without essential change in principle, is adapted to be used in connection with the rear end of the frame, if desired. These and other advantages of my improved construction will, however, be clearly apparent to those skilled in the art.

While I have in this application specifically described the above forms of my invention, it will be understood that these forms are shown for purposes of illustration, and that the invention may be modified and embodied in various other forms without departing from its spirit or the scope of the appended claims.

What I claim as new and desire to secure by Letters Patent is:

1. In combination, a vehicle frame having rigidly connected side members, a plurality of arms pivoted on said side members for independent up and down movement, longitudinally extending independent spring connections to said frame extending longitudinally of said arms, for enabling such movement, stub axle carrying members operatively connected to said arms to permit up and down movement of said axle carrying members as said arms move about their pivots, and mechanism for controlling the movement of said axle carrying members and said arms including transverse members pivotally connected at adjacent ends to said frame and connections between the opposite ends of said transverse members and said stub axle carrying members including means rigidly connected to the opposite ends of said transverse members and pivotally connected to said stub axle carrying members to control the up and down movement of the latter.

2. In combination, a vehicle frame having rigidly connected side members, a plurality of forwardly extending arms pivoted on said members for independent up and down movement, longitudinally extending independent spring connections to said frame extending longitudinally of said arms, for enabling such movement, stub axle carrying members, and mechanism for effecting controlled movement of said axle carrying members as said arms move about their pivots including transverse members pivotally connected at adjacent ends to said frame and operative connections between the arm, the transverse member, and the axle carrying member on each side of said frame, including a rigid connection to one of the same in the plane of movement of said arm and movable only about the pivot of the transverse member on the frame, and a pivotal connection between said rigid connection and said axle carrying member.

3. In combination, a vehicle frame having rigidly connected side members, a plurality of wheel carrying members pivotally connected to said side members for independent up and down movement, longitudinally extending independent spring connections to said frame extending longitudinally of said arms, for enabling such movement, and mechanism for controlling the movement of each of said wheel carrying members including members disposed at substantially right angles to each other and having their outer ends pivotally secured to the vehicle frame and having their adjacent ends connected to said wheel carrying member to permit such independent springing movement.

4. In combination, a vehicle frame having rigidly connected side members, a plurality of forwardly extending arms on said members pivoted for independent up and down movement, independent spring connections to said frame for enabling such movement, stub axle carrying members movable with said arms, and mechanism for controlling the movement of said axle carrying members including transverse members pivotally connected at adjacent ends to said frame, upstanding means on the opposite ends of said transverse members rigidly connected thereto, and means pivotally connecting said axle carrying members to said upstanding means.

5. In combination, a vehicle frame having rigidly connected side members, a plurality of longitudinally extending arms on said side members pivoted for independent up and down movement, axle carrying members movable with said arms, mechanism for controlling the movement of said axle carrying members including transverse members pivotally connected at adjacent ends to said frame and means for insuring that said arms move up and down about their pivots on said frame free from substantial lateral movement as said transverse members move up and down about their pivots on the frame, and independent spring means extending longitudinally of said arms and each acting between said frame and one of said arms and one of said transverse members.

6. In a vehicle, the combination of a vehicle frame having side members, independently movable arms extending alongside the frame and said side members substantially to one end of the frame, means remote from said end for pivoting said arms to the side members of the frame to swing only in an up and down direction, a wheel-carrying stub axle carried by each arm remote from its pivot, springs interposed between the arms and the frame side members, and oppositely disposed transverse members pivoted to said frame and connecting the free ends of the arms to said frame while permitting movements of the wheels in vertical planes.

7. In combination, a vehicle frame having rigidly connected side members, a plurality of wheel carrying members pivoted on said side members for independent substantially vertical movement and having independent spring connections to said frame for enabling such vertical movement, and mechanism controlling the movement of said wheel carrying members including oppositely disposed transverse members pivoted to said frame and having upstanding means rigidly connected to said transverse members and pivotally connected to the free ends of said wheel carrying members.

8. In a vehicle spring suspension, a vehicle frame, arms at the sides of and below the frame, rigid pivot means for pivoting said arms to the side members of the frame so that said arms swing only in vertical planes directed lengthwise of the vehicle, said arms having free end portions, a wheel-carrying stub axle carried by the free end portion of each arm, said stub axle being mounted on a vertical swivel and movable horizontally about the same, and a spring interposed between the upper part of each arm and the vehicle frame and suspending the arm and acting on the portion of said arm carrying said stub axle in the pivoting plane of said arm.

9. In a spring suspension for vehicles, a vehicle frame, independently movable arms extending alongside the frame substantially to one end thereof and each pivoted to the frame at the side of the latter and remote from said end to swing in a vertical plane, a wheel-carrying stub axle carried by each arm adjacent the free end portion thereof, flexible connections between the latter and said frame, and a longitudinally directed leaf spring interposed between the free end portion of each arm and the side of the vehicle frame and suspending the portion of said arm carrying said stub axle in the pivoting plane of the arm so that said portion moves in a vertical plane directed lengthwise of the vehicle.

10. In an independent spring suspension for vehicle wheels, the combination of a main vehicle frame, an arm pivoted to the vehicle frame at the side thereof and extending substantially horizontally lengthwise of the vehicle below the frame, a wheel-carrying stub axle carried by said arm adjacent the free end portion thereof, said stub axle being mounted on a vertical swivel and movable horizontally about the same, and a longitudinally disposed leaf spring between the side of the vehicle frame and the arm supporting the arm from above and acting in the pivoting plane thereof and located longitudinally of the vehicle so that a portion of said spring is disposed vertically above the stub axle, the portion of said arm carrying said stub axle being supported for movement in a vertical plane directed lengthwise of the vehicle.

11. In an independent spring suspension for vehicle wheels, a main frame, an arm, means for pivoting said arm at one end to said frame at the side of the latter to swing only in an up and down direction, a wheel-carrying stub axle carried by said arm adjacent the free end portion thereof, a spring connection between the arm and the frame which permits the wheel to move in a vertical plane directed lengthwise of the vehicle, and controlling means for connecting the free end portion of said arm laterally with the vehicle frame without interfering with the movement of the wheel in said vertical plane.

12. In an independent spring suspension for vehicle wheels, the combination of a main vehicle frame having a side member, an arm pivoted to the vehicle frame at the side thereof and extending substantially horizontally lengthwise of the vehicle below and substantially parallel to said side member, said arm being adapted to swing in a vertical plane directed lengthwise of the vehicle, a wheel carrying stub axle carried by said arm adjacent the free end thereof, a longitudinally disposed leaf spring between said side member of the vehicle frame and the arm suspending the arm intermediate of its ends from said member and located over said stub axle, and lateral arm controlling means connecting the arm with the vehicle frame while permitting movement of the stub axle carrying portion of said arm in said vertical plane.

13. In a vehicle spring suspension, a vehicle frame, an arm alongside but below a portion of the frame, means for pivoting said arm to said frame so that the swinging movement of the arm is confined to a vertical direction, a spring above the arm acting on the same in the aforesaid vertical plane, a wheel-carrying stub axle carried by the free end portion of the arm, and a flexible lateral controlling connection between the free end portion of the arm and the vehicle frame which permits the stub axle carrying portion of the arm to move in said vertical plane.

14. In an independent spring suspension for vehicle wheels, a vehicle frame, an arm pivoted thereto at the side thereof for swinging movement confined to a vertical direction, a longitudinally disposed leaf spring above the arm acting on the arm in said plane, a wheel-carrying stub axle carried by the arm and positioned longitudinally of the arm so as to be beneath said spring, and a flexible lateral controlling and connecting means for said arm connected with the vehicle frame and attached to the arm beneath the stub axle carrying portion thereof.

15. In an independent spring suspension for vehicle wheels, a vehicle frame, an arm rigidly pivoted to said frame for swinging movement confined to a vertical plane directed lengthwise of the vehicle, a wheel-carrying stub axle carried by the free end portion of said arm, a spring interposed between said arm and the frame and acting on said arm in said plane, and a lateral controlling connection for the wheel between the free end portion of said arm and the vehicle frame including a transverse link member having an end portion disposed below the arm and having a swivel connection with the arm at the lower part of the arm.

16. In an independent spring suspension for vehicle wheels, a main frame, an arm pivoted to said main frame at the side of the latter to swing up and down, a stub axle carried by the free end portion of said arm, said main frame having a portion above and substantially parallel with the free end portion of said arm, a spring interposed between said portion of the frame and the upper portion of said arm, said spring being located longitudinally of the vehicle so that a portion thereof is vertically in line with said stub axle, and a lateral connection between said arm and the vehicle frame attached to the arm below the stub axle, said lateral connection permitting the free end portion of the arm to move in a vertical plane disposed lengthwise of the vehicle.

17. In a spring suspension for vehicles, a main frame, arms independently pivoted to said main frame at the sides thereof and each carrying a stub axle adjacent the free end of the arm, said frame having portions spaced above said arms, a leaf spring interposed between each arm and the corresponding spaced portion of the main frame and having its ends pivoted to the arm and the middle portion attached to the spaced portion of the main frame, and a lateral connection between the free end portion of each arm and the main frame which permits the free end portion of arm to move in a vertical plane directed lengthwise of the vehicle.

18. In a spring suspension for vehicles, a main frame, arms independently pivoted to said main frame at the sides thereof and each carrying a stub axle adjacent the free end of the arm, said frame having portions spaced above said arms, a leaf spring interposed between each arm and the corresponding spaced portion of the main frame and having its ends pivoted to the spaced portion of the frame and its middle portion attached to the arm, and a lateral connection between the free end portion of each arm and the main frame which permits the free end portion of the arm to move in a vertical plane directed lengthwise of the vehicle.

19. In a spring suspension for vehicles, a main frame, arms independently pivoted to said main frame at the sides thereof and each carrying a stub axle adjacent the free end of the arm, said frame having portions spaced above said arms, a spring interposed between said spaced portion of the frame and said arm and having one end fixed to said spaced portion of the frame and the other end pivoted to said arm, and a lateral connection between the free end portion of each arm and the main frame which permits the free end portion of the arm to move in a vertical plane directed lengthwise of the vehicle.

20. In a spring suspension for vehicles, a main frame, arms independently pivoted to said main frame at the sides of the latter to swing up and down, stub axles carried by the free end portions of said arms, longitudinally disposed leaf springs interposed between the respective arms and the respective side members of the main frame and suspending said arms at points intermediate of their ends, said stub axles being carried by said arms at points between the extremities of said arms and the pivots thereof, and shock absorbers connecting the free extremities of said arms and corresponding side members of the main frame, said shock absorbers being arranged so as to permit the extremities of said arms to move in vertical planes directed lengthwise of the vehicle.

21. In a vehicle suspension, a main frame having side members, a wheel-carrying arm independently pivoted to each of the main frame side members for movement confined to a vertical plane directed lengthwise of the vehicle, a stub axle on each arm adjacent the free end thereof, said arm being normally disposed in spaced relation below a portion of the corresponding side member of the frame, a longitudinally disposed leaf spring interposed between each arm and the corresponding side member of the frame and positioned longitudinally of the arm so as to have a portion arranged vertically over the stub axle, a transverse member rigidly interconnecting the side members of the main frame above and substantially in line with said stub axles, link members pivoted to the intermediate portion of said transverse member and extending downwardly and laterally beneath said wheel carrying arms, and means for connecting said link members with the under portions of said arms at points below said stub axles, said last named means including swivel members whose axes are substantially parallel to the wheel-carrying arms, said link members connecting the respective arms laterally with the main frame but permitting the stub axle carrying portions of said arms to move in vertical planes directed lengthwise of the vehicle.

22. In a vehicle suspension, a main frame comprising rigidly connected laterally spaced side members, each having a forwardly and upwardly inclined portion adjacent the front end of the vehicle and a longitudinally extending portion in advance of said inclined portion, a wheel carrying side member independently pivoted to each of said main frame side members adjacent the base of said upwardly inclined portion thereof and normally disposed below the longitudinally extending portion thereof, the swinging movement of each wheel carrying side member on its pivot being confined to a vertical plane directed lengthwise of the vehicle, stub axles projecting laterally from said wheel-carrying side members at the sides thereof, adjacent their forward ends, a longitudinally disposed leaf spring connecting each wheel-carrying member with the corresponding main frame side member, said spring being connected to one of said side members at points located respectively in advance of the stub axle and at the rear thereof, a transverse member rigidly interconnecting the side members of the main frame and substantially in line with said stub axles, bracket members depending from the wheel-carrying side members below the stub axles, and flexible connections between the intermediate portion of said transverse member and said bracket members.

HERMAN KRAEKEMIER.